US012351144B2

(12) United States Patent
Roether et al.

(10) Patent No.: US 12,351,144 B2
(45) Date of Patent: Jul. 8, 2025

(54) HOUSING DEVICE AND PLUNGER FOR A BRAKE DEVICE FOR A VEHICLE, BRAKE DEVICE AND METHOD FOR OPERATING A BRAKE DEVICE (71) Applicant: Knorr-Bremse Systeme Fuer Nutzfahrzeuge GmbH, Munich (DE)

(72) Inventors: Friedbert Roether, Cleebronn (DE); Thilo Schmauder, Tamm (DE)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 217 days.

(21) Appl. No.: 17/997,529

(22) PCT Filed: Apr. 29, 2021

(86) PCT No.: PCT/EP2021/061269
§ 371 (c)(1),
(2) Date: Oct. 28, 2022

(87) PCT Pub. No.: WO2021/233659
PCT Pub. Date: Nov. 25, 2021

(65) Prior Publication Data
US 2023/0192059 A1 Jun. 22, 2023

(30) Foreign Application Priority Data
May 19, 2020 (DE) ...................... 10 2020 113 523.8

(51) Int. Cl.
*B60T 17/08* (2006.01)
(52) U.S. Cl.
CPC .......... *B60T 17/088* (2013.01); *B60T 17/081* (2013.01)

(58) Field of Classification Search
CPC .......... B60T 7/042; B60T 7/06; B60T 17/081; B60T 17/088
See application file for complete search history.

(56) References Cited

U.S. PATENT DOCUMENTS

| 6,422,125 B1* | 7/2002 | Fulks | B60Q 1/441 91/376 R |
| 8,978,457 B2* | 3/2015 | Naether | B60T 7/042 73/129 |

(Continued)

FOREIGN PATENT DOCUMENTS

| DE | 102014112014 A1 | 2/2016 |
| DE | 102016207839 A1 | 12/2016 |

(Continued)

OTHER PUBLICATIONS

International Search Report for PCT/EP2021/061269 dated Sep. 10, 2021.

*Primary Examiner* — Thomas J Williams
(74) *Attorney, Agent, or Firm* — NORTON ROSE FULBRIGHT US LLP (57) ABSTRACT A housing device for a brake device for a vehicle, including: a piston chamber for accommodating a plunger, which is movable linearly in the piston chamber by an actuation by a driver; and a sensor chamber, which is separated from the piston chamber, and which includes a sensor unit, which is configured to detect a position and/or a movement of the plunger in the piston chamber, to effect a braking operation of the vehicle. Also described are a related plunger, a brake device, a method, an apparatus, and a computer readable medium.

11 Claims, 4 Drawing Sheets (56) References Cited

U.S. PATENT DOCUMENTS

| | | | |
|---|---|---|---|
| 9,383,279 B2* | 7/2016 | Sim | G01L 5/28 |
| 10,124,778 B1* | 11/2018 | Forwerck | B60R 16/0231 |
| 2003/0041725 A1* | 3/2003 | Fulks | B60T 7/042 |
| | | | 91/376 R |
| 2003/0075975 A1* | 4/2003 | Fulks | B60T 8/00 |
| | | | 303/113.4 |
| 2016/0016567 A1* | 1/2016 | Jürgens | B60T 8/368 |
| | | | 303/10 |
| 2016/0325723 A1 | 11/2016 | Kang | |
| 2017/0043756 A1 | 2/2017 | Drumm | |
| 2017/0182988 A1 | 6/2017 | Kawakami et al. | |
| 2017/0190324 A1* | 7/2017 | Huber | G05G 1/30 |
| 2023/0192059 A1* | 6/2023 | Roether | B60T 17/08 |
| | | | 188/72.4 |

FOREIGN PATENT DOCUMENTS

| | | |
|---|---|---|
| DE | 102016005377 A1 | 11/2017 |
| DE | 102017217608 A1 | 4/2019 |
| DE | 102019200581 A1 | 8/2019 |
| EP | 3172101 A1 | 5/2017 |
| JP | 2017521310 A | 8/2017 |
| JP | 2019132754 A | 8/2019 |
| WO | WO-2012076514 A1 * 6/2012 ............ B60T 15/043 |
| WO | 2016012066 A1 | 1/2016 |
| WO | WO-2016041753 A1 * 3/2016 .............. B60T 11/18 |

* cited by examiner

HOUSING DEVICE AND PLUNGER FOR A BRAKE DEVICE FOR A VEHICLE, BRAKE DEVICE AND METHOD FOR OPERATING A BRAKE DEVICE

FIELD OF THE INVENTION

The present approach is based on a housing device for a brake device for a vehicle, a piston for a brake device, a brake device having a housing device, and a piston and a method for operating a brake device.

BACKGROUND INFORMATION

German patent document DE 10 2014 112 014 A1 discusses a method for controlling a service brake device of a vehicle and a service brake valve device for a service brake device of this type.

SUMMARY OF THE INVENTION

Against this background, the problem addressed by the present approach is to create an improved housing device for a brake device for a vehicle, an improved piston for a brake device, a brake device having an improved housing device and an improved piston, and, finally, an improved method for operating a brake device.

This problem may be solved by a housing device having the features of the device as described herein, by a piston as described herein, by a brake device as described herein, by a method as described herein, by a device as described herein, and by a computer readable medium and/or computer program as described herein.

The advantages achievable with the approach presented here are that a period of operation of a brake device can be increased.

A housing device for a brake device for a vehicle has a piston chamber, a sensor chamber, and a sensor unit. The piston chamber is configured to accommodate a piston, which is movable in a linear manner in the piston chamber by an actuation by a driver. The sensor chamber is separated from the piston chamber and has the sensor unit arranged in the sensor chamber. The sensor unit is configured to detect a position and, additionally or alternatively, a movement of the in the piston chamber in order to effect a braking operation of the vehicle.

The plunger-piston package is movable in the piston chamber by the actuation by the driver, for example, due to a manual pressing or a foot actuation, in order to indicate a braking intent of the driver. The braking intensity desired by the driver is detectable depending on the intensity of the actuation by the driver, i.e., the linear movement of the piston induced in this way. The sensor unit is configured to identify this movement, i.e., a stroke of the piston. Since the housing device presented here has separate chambers for the piston and the sensor unit, the sensor unit is advantageously not affected by movements of the piston. Thus, for example, during the operation of the piston, no grease from the piston chamber, which could adversely affect a function of the sensor unit, can reach the sensor unit. A durability or period of operation of the sensor unit can therefore be increased.

The sensor unit can include at least one Hall sensor and, additionally or alternatively, a reed switch, which are/is configured to sensor-identify a magnetic field emanating from the plunger, in order to detect the position and, additionally or alternatively, the movement of the plunger. In this way, a contactless and nevertheless precise detection of the position and, additionally or alternatively, of the movement of the plunger is enabled.

The piston chamber can include a plunger opening for accommodating a plunger piston section of the piston, wherein the sensor chamber can be arranged at an end of the piston chamber facing the plunger opening. The plunger piston section is to be understood as that section of the piston which is actuated, i.e., pressed into the piston chamber, by the driver to indicate the braking intent. The plunger opening can be arranged at a top side of the piston chamber. The plunger opening can be a passage opening through the top side of the piston chamber or through a housing cover of the piston chamber. A plunger of the plunger piston section can thus protrude from the piston chamber through the plunger opening, in order to enable the actuation. The sensor chamber can be arranged at a lateral wall of the housing device extending transversely to the top side, in order to be able to detect the linear movement of the plunger piston section from the side. The sensor chamber can be arranged within or outside the piston chamber.

For example, the piston chamber and the sensor chamber can be fluidically separated from each other by a partition. The piston chamber and the sensor chamber can also be hermetically separated from each other by the partition. In this way, liquid, grease, or also air can be prevented from passing between the piston chamber and the sensor chamber.

A wall thickness of the partition can be formed smaller than a housing wall thickness of a housing section of the housing device adjacent to the partition and, additionally or alternatively, wherein the partition can include a non-ferromagnetic material. In this way, field lines of a magnetic field emanating from the plunger can be sensor-identifiable through the partition.

It is also advantageous when the sensor chamber according to one embodiment has a cover, which forms an outer wall of the housing device and, additionally or alternatively, is formed to be removable. In this way, a removal or replacement of the sensor unit or of another electronics device in the sensor chamber is quickly and easily enabled.

The piston chamber can include a compressed air connection opening, in particular which can open into a lateral wall of the piston chamber situated opposite the sensor chamber. A compressed air connection opening of this type can be used to enable a braking operation of the vehicle also without actuation by the driver. For this purpose, the compressed air connection opening can open, for example, substantially centrally, into the lateral wall of the piston chamber situated opposite the sensor chamber, for example, into an area in which a piston spring of the piston can be arranged. In this way, in the event of an actuation by compressed air, the plunger can be prevented from being moved by the compressed air and a sufficient amount of installation space remains at the lateral wall for the sensor chamber. In an embodiment in particular including the compressed air connection opening, the sensor chamber can be advantageously hermetically separated from the piston chamber. In this way, the sensor unit can be protected against compressed air and no additional reinforcement is necessary for a cover of the sensor compartment.

Moreover, a plunger for a brake device is provided, which is arranged or arrangeable in the piston chamber of one of the above-described housing devices and includes a transmitter element for determining the position and, additionally or alternatively, the movement of the plunger in the piston chamber, in particular wherein the piston includes a plunger piston section for actuation by a driver, a control piston section and, additionally or alternatively, a piston spring arranged between the plunger piston section and the control piston section. A piston of this type is suitable for use with the housing device. The transmitter element of the plunger can be arranged at an outer wall of the plunger piston section and, additionally or alternatively, include at least one magnet for generating a magnetic field. In this way, the above-described sensor-identification of the magnetic field by the housing device is enabled. The magnet can be arranged at the plunger piston section facing the sensor chamber.

A brake device includes a housing device, which is formed in one of the above-described variants, and a plunger arranged or arrangeable in the housing device, the plunger being formed in one of the above-described variants. The brake device can be a foot brake device or a hand brake device for a vehicle.

A method for operating one of the above-described brake devices includes the following steps:

detecting a position or a movement of the plunger in the piston chamber; and outputting a sensor signal by utilizing the position or movement detected in the step of detecting, wherein the sensor signal is configured to effect the braking operation of the vehicle.

This method may be implemented, for example, in software or hardware or in a mixed form of software and hardware, for example, in a control unit.

The approach presented here furthermore provides a device which is configured for carrying out, controlling, or implementing the steps of a variant of a method presented here in corresponding units. The object of the approach may also be rapidly and efficiently achieved with the aid of this embodiment variant of the approach in the form of a device.

For this purpose, the device may include at least one processing unit for processing signals or data, at least one memory unit for storing signals or data, at least one interface to a sensor or an actuator for reading in sensor signals from the sensor or for outputting data or control signals to the actuator and/or at least one communication interface for reading in or outputting data which are embedded in a communication protocol. The processing unit may be, for example, a signal processor, a microcontroller, or the like, the memory unit being a flash memory, an EPROM, or a magnetic memory unit. The communication interface may be configured for reading in or outputting data in a wireless and/or wire-bound manner, a communication interface, which may read in or output wire-bound data, may read in these data, for example, electrically or optically from a corresponding data transmission line or outputting these data into a corresponding data transmission line.

In the present case, a device may be understood to be an electrical device that processes sensor signals and, as a function thereof, outputs control and/or data signals. The device may include an interface, which may be in the form of hardware and/or software. In the case of a hardware configuration, the interfaces may be part of a so-called system ASIC, for example, which contains highly diverse functions of the device. It is also possible, however, that the interfaces are standalone, integrated circuits or are formed, at least in part, from discrete components. In the case of a software configuration, the interfaces may be software modules, which are present, for example, on a microcontroller in addition to other software modules.

In one advantageous embodiment, a control of a sensor signal in order to effect a braking operation of a vehicle is carried out by the device. For this purpose, the device can detect, for example, a position or a movement of a plunger in the piston chamber and output the sensor signal by utilizing the detected position or movement. The activation takes place via actuators, such as a sensor unit for detecting the position or movement, and an output device for outputting the sensor signal.

Exemplary embodiments of the approach presented here are explained in greater detail in the following description with reference to the figures.

In the following description of favorable exemplary embodiments of the present approach, identical or similar reference characters are used for the similarly functioning elements represented in the different figures, a repeated description of these elements being dispensed with.

DETAILED DESCRIPTION

Figure 1:
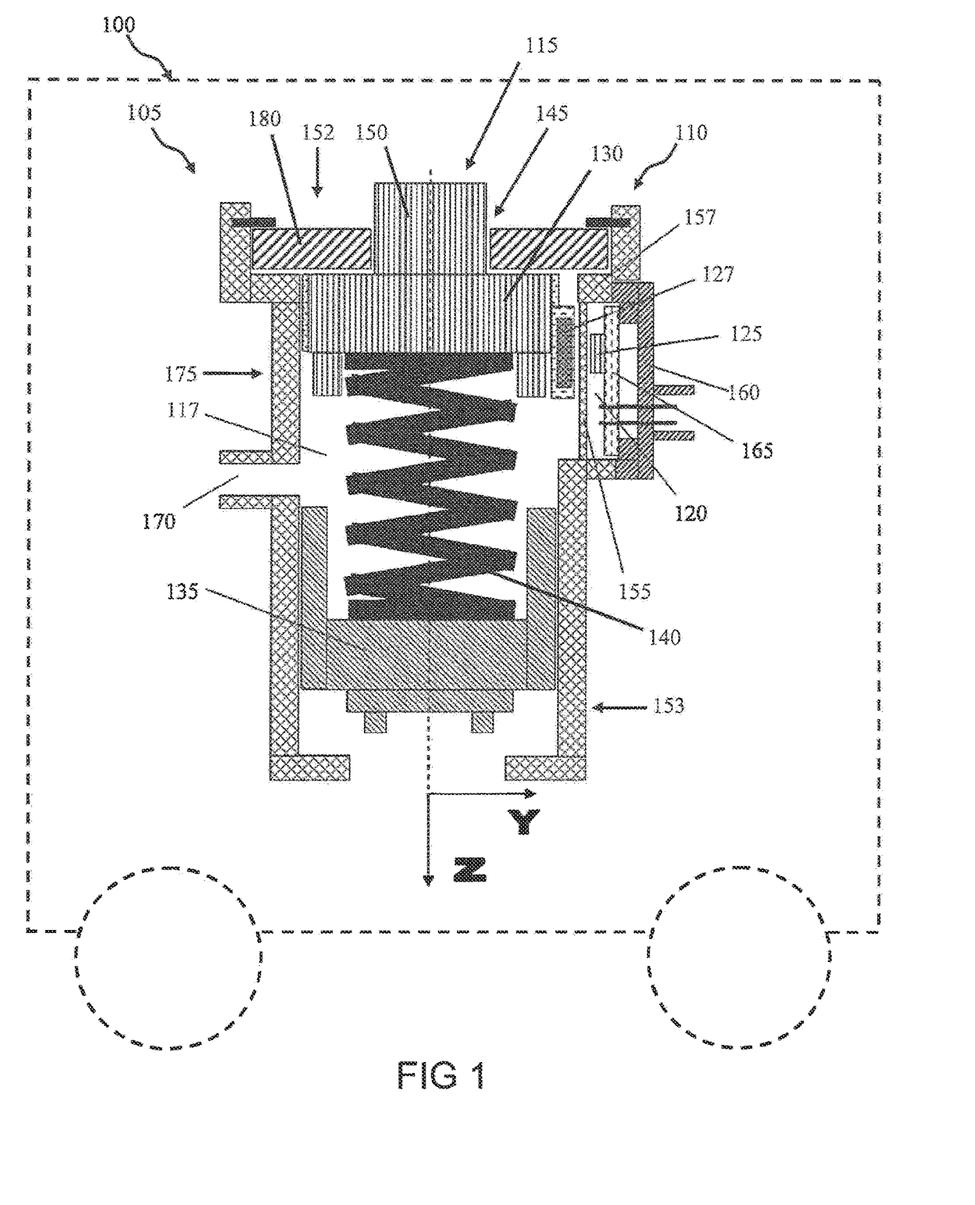
FIG. 1 shows a cross-sectional representation of a vehicle that includes a brake device having a housing device and a piston according to one exemplary embodiment.

FIG. 1 shows a cross-sectional representation of a vehicle 100 that includes a brake device 105 having a housing device 110 and a plunger 115 according to one exemplary embodiment.

Merely by way of example, the brake device 105 according to this exemplary embodiment is accommodated at or in the vehicle 100 and/or configured as a foot brake device for actuation by a foot. According to an alternative exemplary embodiment, the brake device 105 is configured as a hand brake device. The brake device 105 includes the housing device 110 and the plunger 115, which, in a condition of the brake device 105 shown here, is accommodated in the housing device 110. The brake device 105 is, according to this exemplary embodiment, represented in a resting state in which the brake device 105 is not actuated.

The housing device 110 includes a piston chamber 117, a sensor chamber 120, and a sensor unit 125. The piston chamber 117 is configured to accommodate the plunger 115, which is movable in a linear manner in the piston chamber 117 by an actuation by a driver. The sensor chamber 120 is separated from the piston chamber 117 and has the sensor unit 125 arranged in the sensor chamber 120. The sensor unit 125 is configured to detect a position and/or a movement of the plunger 115 in the piston chamber 117, in order to effect a braking operation of the vehicle 100.

The details of the housing device 110 and/or of the plunger 115 described in the following are optional:

The plunger 115 is, according to this exemplary embodiment, accommodated in the piston chamber 117 and includes a transmitter element 127 for determining the position and/or the movement of the plunger 115 in the piston chamber 117. According to this exemplary embodiment, the plunger 115 includes a plunger piston section 130 for actuation by the driver, a control piston section 135, and/or a piston spring 140 arranged between the plunger piston section 130 and the control piston section 135. The transmitter element 127 is, according to this exemplary embodiment, arranged at an outer wall of the plunger piston section 130 and/or includes at least one magnet for generating a magnetic field. The magnet is, according to this exemplary embodiment, arranged at the plunger piston section 130 facing the sensor chamber 120.

The sensor unit 125 includes at least one Hall sensor and/or reed switch, which are/is configured to sensor-identify a magnetic field emanating from the plunger 115, in order to detect the position and/or the movement of the plunger 115. The piston chamber 117 includes, according to this exemplary embodiment, a plunger opening 145 for accommodating the plunger piston section 130 of the plunger 115, wherein the sensor chamber 120 is arranged at an end of the piston chamber 117 facing the plunger opening 145. A plunger 150 of the plunger piston section 130 protrudes, according to this exemplary embodiment, from the piston chamber 117, in order to enable the actuation of the plunger 115 by the driver. The plunger opening 145 is, according to this exemplary embodiment, arranged at a top side 152 of the piston chamber 117 and/or wherein the sensor chamber 120 according to this exemplary embodiment is arranged at a lateral wall 153 of the housing device 110 extending transversely to the top side 152. The piston chamber 117 and the sensor chamber 120 are, according to this exemplary embodiment, fluidically separated from each other by a partition 155. A wall thickness of the partition 155 is, according to this exemplary embodiment, smaller than a housing wall thickness of a housing section 157 of the housing device 110 adjacent to the partition 155 and/or wherein the partition 155 includes a non-ferromagnetic material. The sensor chamber 120 includes, according to this exemplary embodiment, a cover 160 in the form of an electronics cover, which forms an outer wall of the housing device 110 and/or is formed to be removable. According to this exemplary embodiment, the cover 160 forms a wall of the sensor chamber 120 situated opposite the partition 155. The sensor unit 125 is, according to this exemplary embodiment, part of a device 165 that is also arranged in the sensor compartment 120 and can also be referred to as electronics. According to this exemplary embodiment, the piston chamber 117 includes a compressed air connection opening 170, which, according to this exemplary embodiment, opens into a lateral wall 175 of the piston chamber 117 situated opposite the sensor chamber 120 and/or the lateral wall 153. The compressed air connection opening 170 opens, according to this exemplary embodiment, substantially centrally into the opposite lateral wall 175, into an area of the piston chamber 117, in which the piston spring 140 of the plunger 115 is arranged.

Details of the brake device 105 and the housing device 110 are described once more in greater detail in the following:

The brake device 105 includes the housing device 110 in which the plunger piston section 130 of the plunger 115 is axially movably accommodated having a plunger 150 protruding through the plunger opening 145 in the form of a cover opening of a housing cover 180 of the housing device 110. The plunger 150 is, according to one exemplary embodiment, connected to a service brake actuating element in the form of a foot brake plate from above, i.e., from an end arranged outside the housing device 110. If, therefore, the driver actuates the foot brake plate, the plunger 150 is pressed into the plunger opening 145 and the plunger piston section 130 is moved downward due to the actuating force. The plunger piston section 130 transmits the actuating force onto the control piston section 135, which is also axially movably mounted in the piston chamber 117, according to this exemplary embodiment which may be via the piston spring 140, which is configured, for example, as a compression spring.

The brake device 105 presented here can also be referred to as a foot brake module having spatially separated sensor-identification. One problem addressed by the approach presented here is to separate the sensor chamber 120, which can also be referred to as an "electronics chamber," from the piston chamber 117, which can also be referred to as a "piston working chamber," in the foot brake module and nevertheless sensor-identify the stroke/movement in the piston working chamber actuated by the driver.

In contrast to a potentiometer, which is possibly positionable in the electronics chamber and the mechanical lever of which protrudes into the piston working chamber and, there, is mechanically actuated, or a Hall sensor, which is located on a circuit board in the electronics chamber and the transmitter element of which is mechanically fastened on the plunger located in the piston installation space and protrudes into the electronics chamber, or a possible inductive sensor, the coil of which is positioned in the piston working chamber and the coil is contacted either directly or via a flat connector with the circuit board located in the electronics chamber, the sensor unit 125 of the housing device 110 presented here identifies the position and/or the movement of the plunger 115 advantageously without mechanical contact to the plunger 115, i.e., contactlessly. In this way, grease located in the piston chamber 117 and wear debris arising over a service life cannot come into contact with the electronics. Another advantage is that, in foot brake modules that include electronic pressure control, in which the piston chamber 117 is acted upon by compressed air via the compressed air connection opening 170, in order to move the plunger 115 regardless of the driver input, the electronics in the sensor chamber 120, in the housing device 110 presented here, are not acted upon by compressed air and, thus, also do not come into contact with the media located in the compressed air.

A fundamental concept addressed by the invention is therefore that of spatially separating the sensor unit 125 in the form of a detecting element from the transmitter element 127 and of nevertheless ensuring the function.

In summary, the housing device 110 presented here provides the following advantages:

The sensor unit 125, which can include a circuit board or an evaluation electronics system, is protected against the grease present in the piston chamber 117, the arising mechanical wear debris, and against any condensate that may arise.

In foot brake modules having electronic pressure control, in which the piston working chamber/electronics chamber is acted upon by compressed air, in order to move the piston regardless of the driver input, the electronics are, on the one hand, not acted upon by compressed air and do not come into contact with the media located in the compressed air and, on the other hand, no additional reinforcement of the cover 160 or a use of additional components is needed to withstand the arising pressure.

According to this exemplary embodiment, the plunger 115 includes a magnet, which acts as a transmitter element 127 and/or is located at the plunger piston section 130 in the piston chamber 117. The magnet at the plunger piston section 130 directly follows the driver input in the form of a movement or a stroke. The piston chamber 117 is separated from the sensor chamber 120 by a wall thickness that is reduced to a minimum requirement in the region of the transmitter element 127, so that the field lines of the transmitter element 127 also prevail in the sensor chamber 120. A housing material of the housing device 110 and/or the partition 155 having the appropriately reduced wall thickness is made, according to this exemplary embodiment, from aluminum and/or plastic. The sensor unit 125 includes, according to this exemplary embodiment, a Hall chip and/or a reed switch, which is positioned on the device 165 or another carrier element in the sensor chamber 120 and then uses these field lines to sensor-identify the driver input in the form of a stroke or a movement and/or to actuate the switch. According to an alternative exemplary embodiment, the reduced wall thickness of the partition 155 is not implemented in the same housing, but rather also as a separate component, which is mounted into the housing, between the piston chamber 117 and the sensor chamber 120.

In general, the plunger 150, the plunger piston section 130, and/or the plunger 115 can also (but do not have to) be configured as a (for example, integrated) component, wherein the lower part (the plunger piston section 130 in this case) acts as a transmitter element or a magnetic pickup.

Figure 2:
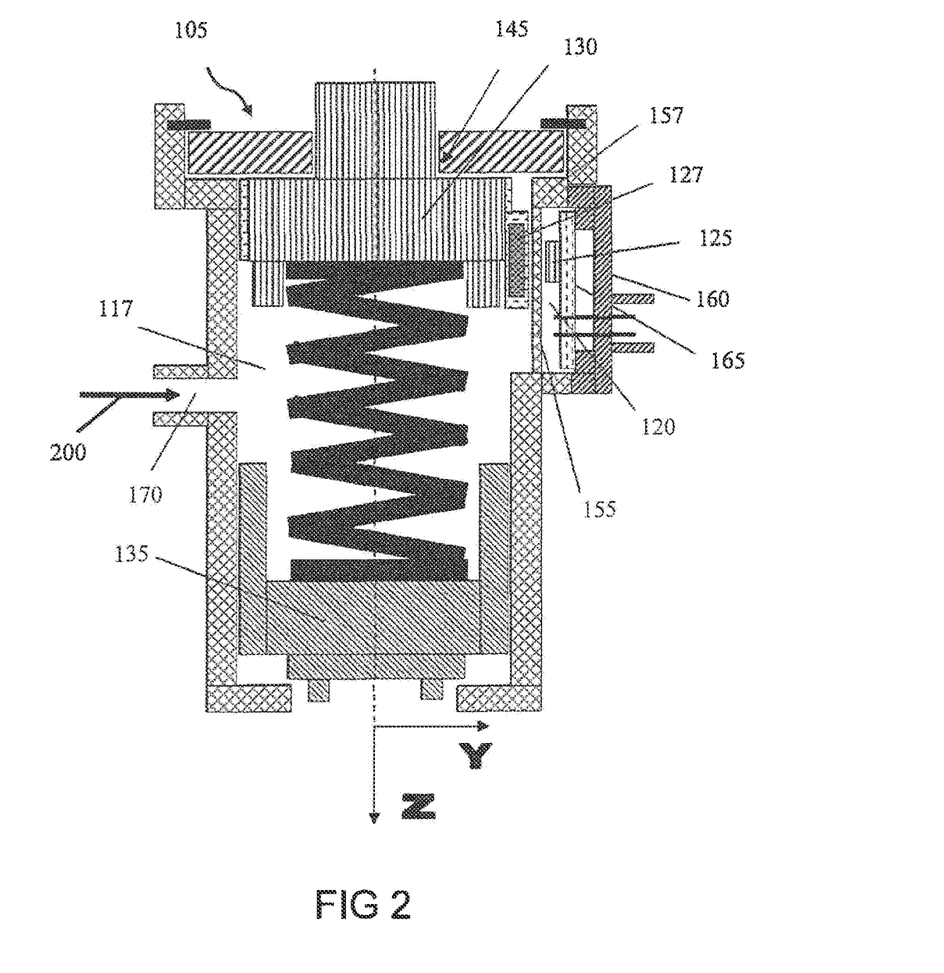
FIG. 2 shows a cross-sectional representation of a brake device according to one exemplary embodiment.

FIG. 2 shows a cross-sectional representation of a brake device 105 according to one exemplary embodiment. This can be an exemplary embodiment of the brake device 105 described with reference to FIG. 1, with the difference that the brake device 105 according to this exemplary embodiment is represented in a condition acted upon by compressed air 200. A position of the plunger piston section 130 and of the transmitter element 127 is unchanged as compared to the resting state of the brake device 105 shown in FIG. 1. The control piston section 135, however, has been moved farther away from the plunger piston section 130 due to the actuation by compressed air. The partition 155 is, according to this exemplary embodiment, configured to hermetically separate the piston chamber 117 from the sensor chamber 120, so that no compressed air 200 enters the sensor chamber 120 during the actuation by compressed air.

Figure 3:
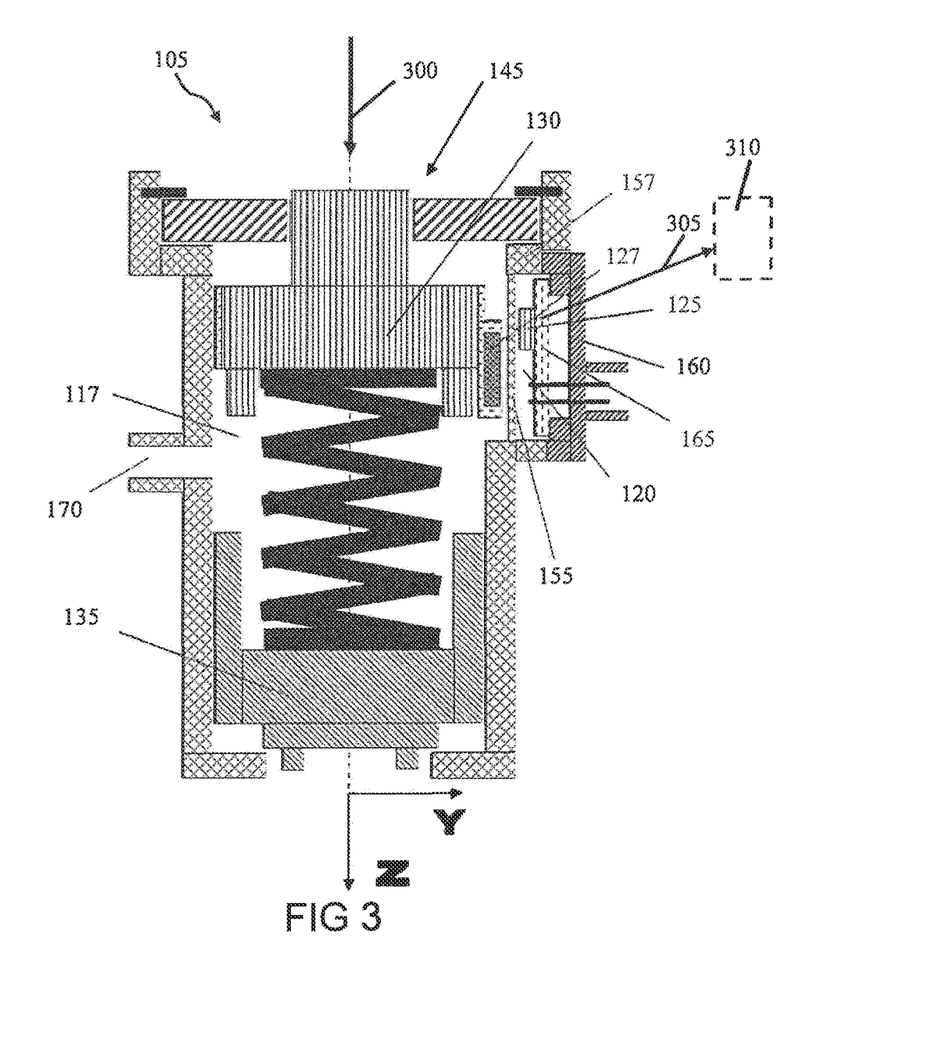
FIG. 3 shows a cross-sectional representation of a brake device according to one exemplary embodiment.

FIG. 3 shows a cross-sectional representation of a brake device 105 according to one exemplary embodiment. This brake device 105 can be an exemplary embodiment of the brake device 105 described with reference to FIG. 1 or FIG. 2, with the difference that the brake device 105 according to this exemplary embodiment is represented in a condition actuated by a foot actuation by a driver. A position of the plunger piston section 130 and of the transmitter element 127 has been moved downward as compared to the resting state of the brake device 105 shown in FIG. 1. The control piston section 135 has also been moved further downward by the piston spring 140.

The sensor unit 125 detects, according to this exemplary embodiment, the position or movement of the plunger 115 in the piston chamber 117. Besides the sensor unit 125, the device 165 according to this exemplary embodiment includes an output device, which is configured to output a sensor signal 305 by utilizing the detected position or movement, the sensor signal 305 representing the detected position or movement. The output device outputs the sensor signal 305 according to this exemplary embodiment to a brake device 310 of the vehicle, the brake device 310 being configured to carry out the braking operation by utilizing the sensor signal 305.

Figure 4:
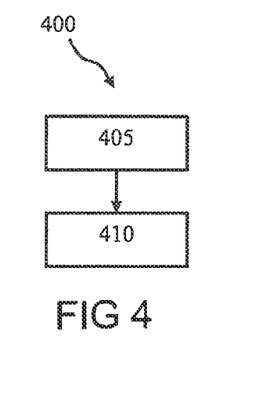
FIG. 4 shows a flow chart of a method for operating a brake device according to one exemplary embodiment.

FIG. 4 shows a flow chart of a method 400 for operating a brake device according to one exemplary embodiment. The brake device can be one of the brake devices described with reference to FIGS. 1 through 3.

The method 400 includes a step 405 of detecting and a step of outputting 410. In the step 406 of detecting, a position or movement of the piston in the piston chamber is detected. In the step 410 of outputting, a sensor signal is output by utilizing the position or movement detected in the step 405 of detecting, wherein the sensor signal is configured to effect the braking operation of the vehicle.

The method steps presented here may be repeated and may be carried out in a sequence other than that described.

If an exemplary embodiment includes an "and/or" linkage between a first feature and a second feature, this is intended to be read that the exemplary embodiment according to one specific embodiment includes both the first feature and the second feature and, according to a further specific embodiment, includes either only the first feature or only the second feature.

THE LIST OF REFERENCE CHARACTERS IS AS FOLLOWS 100 vehicle
105 brake device
110 housing device
115 plunger
117 piston chamber
120 sensor chamber
125 sensor unit
127 transmitter element
130 plunger piston section
135 control piston section
140 piston spring
145 plunger opening
150 plunger
152 top side
153 lateral wall
155 partition
157 housing section
160 cover
165 device
170 compressed air connection opening
175 opposite lateral wall
180 housing cover
200 compressed air
300 foot actuation
305 sensor signal
310 brake device
400 method for operating a brake device
405 step of detecting
410 step of outputting

The invention claimed is:

1. A housing device for a brake device for a vehicle, comprising:
    a piston chamber for accommodating a plunger, which is movable linearly in the piston chamber by an actuation by a driver; and
    a sensor chamber, which is separated from the piston chamber, and which includes a sensor unit, which is configured to detect a position and/or a movement of the plunger in the piston chamber by detecting a magnetic field of a transmitter element of the plunger, to effect a braking operation of the vehicle;
    wherein the transmitter element is arranged at an outer wall of a plunger piston section and includes at least one magnet for generating the magnetic field, and wherein the at least one magnet is arranged at the plunger piston section facing the sensor chamber,
    wherein the piston chamber and the sensor chamber are fluidically separated from each other by a partition,
    wherein the sensor chamber includes a cover, which forms an outer wall of the housing device and/or is formed to be removable, and wherein the piston chamber includes a compressed air connection opening, which opens into a lateral wall of the piston chamber situated opposite the sensor chamber.

2. The housing device of claim 1, wherein the sensor unit includes at least one Hall sensor and/or reed switch that is configured to sensor-identify a magnetic field emanating from the plunger, to detect the position and/or the movement of the plunger.

3. The housing device of claim 1, wherein the piston chamber includes a plunger opening for accommodating a plunger piston section of the plunger, and wherein the sensor chamber is arranged at an end of the piston chamber facing the plunger opening.

4. The housing device of claim 1, wherein the piston chamber and the sensor chamber are fluidically and/or hermetically separated from each other by a partition.

5. The housing device of claim 4, wherein a wall thickness of the partition is smaller than a housing wall thickness of a housing section of the housing device adjacent to the partition, and/or wherein the partition includes a non-ferromagnetic material.

6. A plunger for a brake device, wherein a plunger is arranged or arrangeable in a piston chamber of a housing device, comprising:
a transmitter element for determining the position and/or movement of the plunger in the piston chamber;
wherein the housing device includes:
a piston chamber for accommodating the plunger, which is movable linearly in the piston chamber by an actuation by a driver; and
a sensor chamber, which is separated from the piston chamber, and which includes a sensor unit, which is configured to detect a position and/or a movement of the plunger in the piston chamber by detecting magnet of the transmitter element to effect a braking operation of the vehicle;
wherein the plunger includes a plunger piston section for actuation by the driver, a control piston section and/or a piston spring arranged between the plunger piston section and the control piston section, and
wherein the transmitter element is arranged at an outer wall of the plunger piston section and includes at least one magnet for generating the magnetic field, and wherein the at least one magnet is arranged at the plunger piston section facing the sensor chamber,
wherein the piston chamber and the sensor chamber are fluidically separated from each other by a partition,
wherein the sensor chamber includes a cover, which forms an outer wall of the housing device and/or is formed to be removable, and
wherein the piston chamber includes a compressed air connection opening, which opens into a lateral wall of the piston chamber situated opposite the sensor chamber.

7. A brake device, comprising:
a housing device, including:
a piston chamber for accommodating a plunger, which is movable linearly in a piston chamber by an actuation by a driver; and
a sensor chamber, which is separated from the piston chamber, and which includes a sensor unit, which is configured to detect a position and/or a movement of the plunger in the piston chamber by detecting a magnetic field of a transmitter element of the plunger, to effect a braking operation of the vehicle; and the plunger, which is arranged or arrangeable in the housing device, wherein the plunger includes:
a plunger piston section for actuation by the driver, a control piston section and/or a piston spring arranged between the plunger piston section and the control piston section;
wherein the transmitter element is arranged at an outer wall of the plunger piston section and includes at least one magnet for generating the magnetic field, and wherein the at least one magnet is arranged at the plunger piston section facing the sensor chamber,
wherein the piston chamber and the sensor chamber are fluidically separated from each other by a partition,
wherein the sensor chamber includes a cover, which forms an outer wall of the housing device and/or is formed to be removable,
wherein the piston chamber includes a compressed air connection opening, which opens into a lateral wall of the piston chamber situated opposite the sensor chamber.

8. A method for operating a brake device, the method comprising:
detecting a position or movement of a plunger in a piston chamber, wherein the brake device includes a housing device, including:
a piston chamber for accommodating the plunger, which is movable linearly in the piston chamber by an actuation by a driver; and
a sensor chamber, which is separated from the piston chamber, and which includes a sensor unit, which is configured to detect a position and/or a movement of the plunger in the piston chamber by detecting a magnetic field of a transmitter element of the plunger, to effect a braking operation of the vehicle; and
the plunger, which is arranged or arrangeable in the housing device, wherein the plunger includes:
a plunger piston section for actuation by the driver, a control piston section and/or a piston spring arranged between the plunger piston section and the control piston section; and
outputting a sensor signal by utilizing the position or movement detected in the step of detecting, wherein the sensor signal is configured to effect the braking operation of the vehicle;
wherein the transmitter element is arranged at an outer wall of the plunger piston section and includes at least one magnet for generating the magnetic field, and wherein the at least one magnet is arranged at the plunger piston section facing the sensor chamber,
wherein the piston chamber and the sensor chamber are fluidically separated from each other by a partition,
wherein the sensor chamber includes a cover, which forms an outer wall of the housing device and/or is formed to be removable,
wherein the piston chamber includes a compressed air connection opening, which opens into a lateral wall of the piston chamber situated opposite the sensor chamber.

9. An apparatus, comprising:
a device configured for operating a brake device, by performing the following:
detecting a position or movement of a plunger in a piston chamber, wherein the brake device includes:
a housing device, including:

the piston chamber for accommodating the plunger, which is movable linearly in the piston chamber by an actuation by a driver; and a sensor chamber, which is separated from the piston chamber, and which includes a sensor unit, which is configured to detect a position and/or a movement of the plunger in the piston chamber by detecting a magnetic field of a transmitter element of the plunger, to effect a braking operation of the vehicle; and the plunger, which is arranged or arrangeable in the housing device, wherein the plunger includes the transmitter element for determining the position and/or movement of the plunger in the piston chamber; and a plunger piston section for actuation by the driver, a control piston section and/or a piston spring arranged between the plunger piston section and the control piston section; and outputting a sensor signal by utilizing the position or movement detected in the step of detecting, wherein the sensor signal is configured to effect the braking operation of the vehicle;

wherein the transmitter element is arranged at an outer wall of the plunger piston section and includes at least one magnet for generating the magnetic field, and wherein the at least one magnet is arranged at the plunger piston section facing the sensor chamber, wherein the piston chamber and the sensor chamber are fluidically separated from each other by a partition, wherein the sensor chamber includes a cover, which forms an outer wall of the housing device and/or is formed to be removable, and wherein the piston chamber includes a compressed air connection opening, which opens into a lateral wall of the piston chamber situated opposite the sensor chamber.

10. A non-transitory computer readable medium having a computer program, which is executable by a processor, comprising:

a program code arrangement having program code for operating a brake device, by performing the following:

detecting a position or movement of a plunger in a piston chamber, wherein the brake device includes a housing device, including:

the piston chamber for accommodating a plunger, which is movable linearly in the piston chamber by an actuation by a driver; and a sensor chamber, which is separated from the piston chamber, and which includes a sensor unit, which is configured to detect a position and/or a movement of the plunger in the piston chamber by detecting a magnetic field of a transmitter element of the plunger, to effect a braking operation of the vehicle; and the plunger, which is arranged or arrangeable in the housing device, wherein the plunger includes:

the transmitter element for the sensor unit for determining the position and/or movement of the plunger in the piston chamber; and a plunger piston section for actuation by the driver, a control piston section and/or a piston spring arranged between the plunger piston section and the control piston section; and outputting a sensor signal by utilizing the position or movement detected in the step of detecting, wherein the sensor signal is configured to effect the braking operation of the vehicle;

wherein the transmitter element is arranged at an outer wall of the plunger piston section and includes at least one magnet for generating the magnetic field, and wherein the at least one magnet is arranged at the plunger piston section facing the sensor chamber, wherein the piston chamber and the sensor chamber are fluidically separated from each other by a partition, wherein the sensor chamber includes a cover, which forms an outer wall of the housing device and/or is formed to be removable, and wherein the piston chamber includes a compressed air connection opening, which opens into a lateral wall of the piston chamber situated opposite the sensor chamber.

11. The computer readable medium of claim 10, wherein the sensor unit includes at least one Hall sensor and/or reed switch that is configured to sensor-identify the magnetic field emanating from the transmitter element of the plunger, to detect the position and/or the movement of the plunger.

* * * * *